April 29, 1930.   H. D. COLMAN   1,756,814
HEDDLE HANDLING MECHANISM
Original Filed Feb. 14, 1924   9 Sheets-Sheet 2
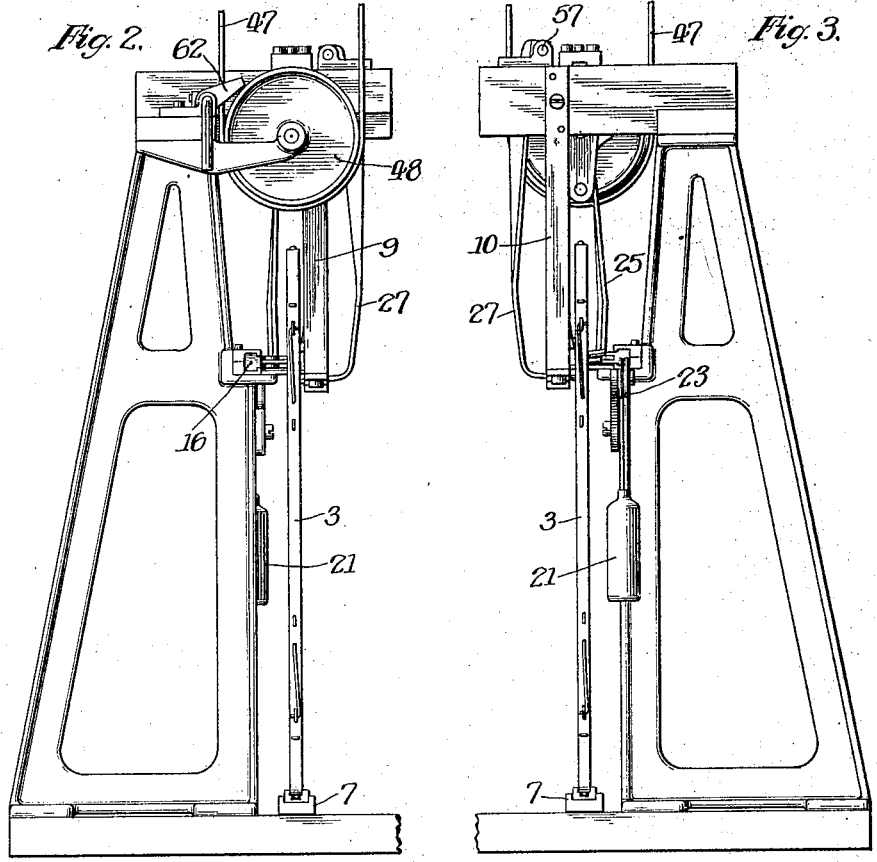
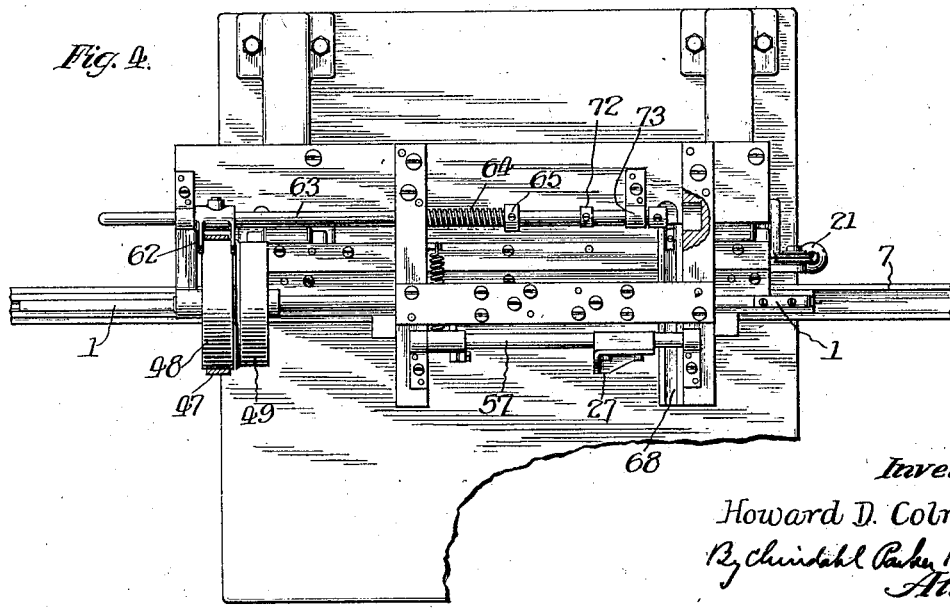

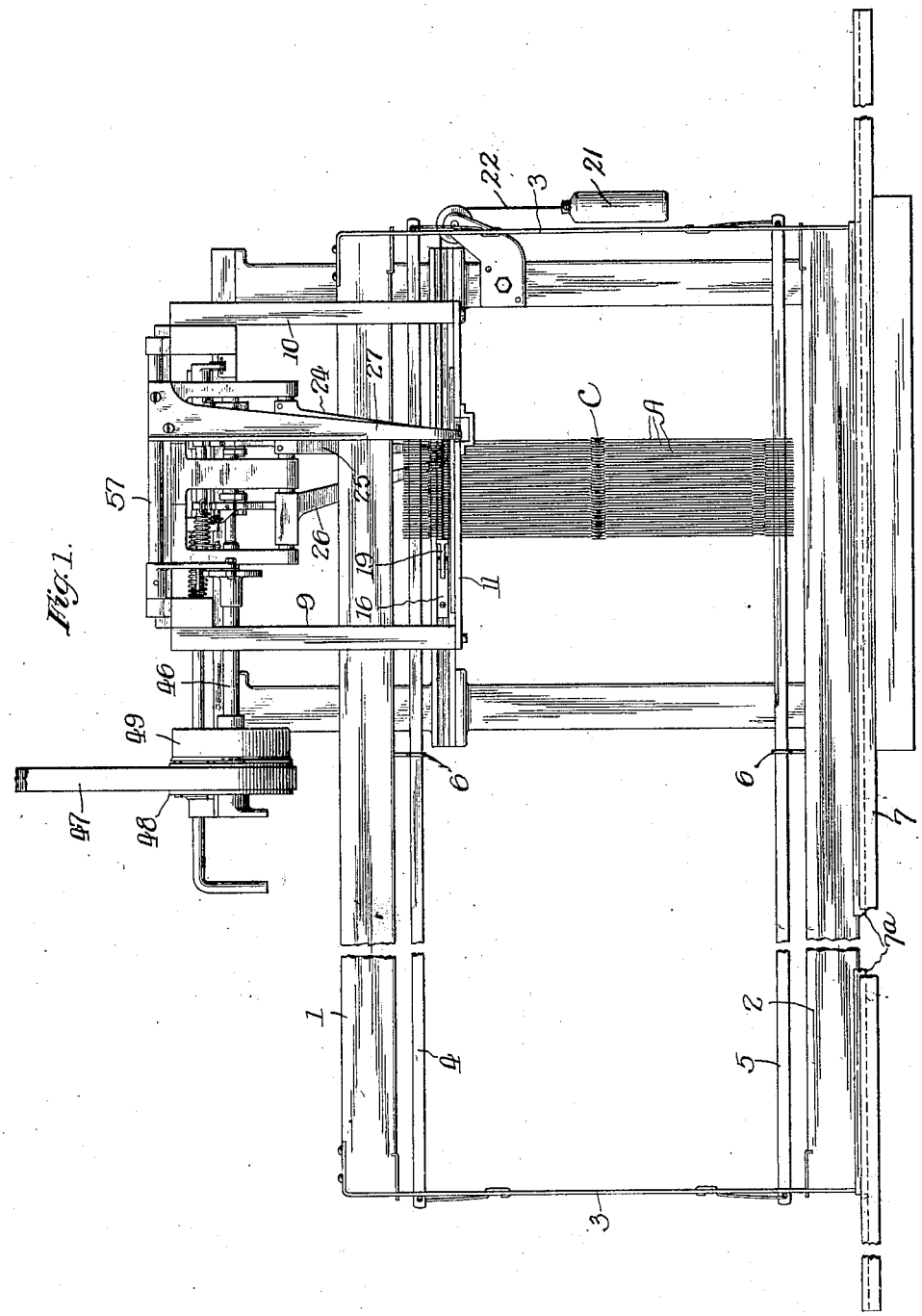

April 29, 1930.  H. D. COLMAN  1,756,814
HEDDLE HANDLING MECHANISM
Original Filed Feb. 14, 1924    9 Sheets-Sheet 3
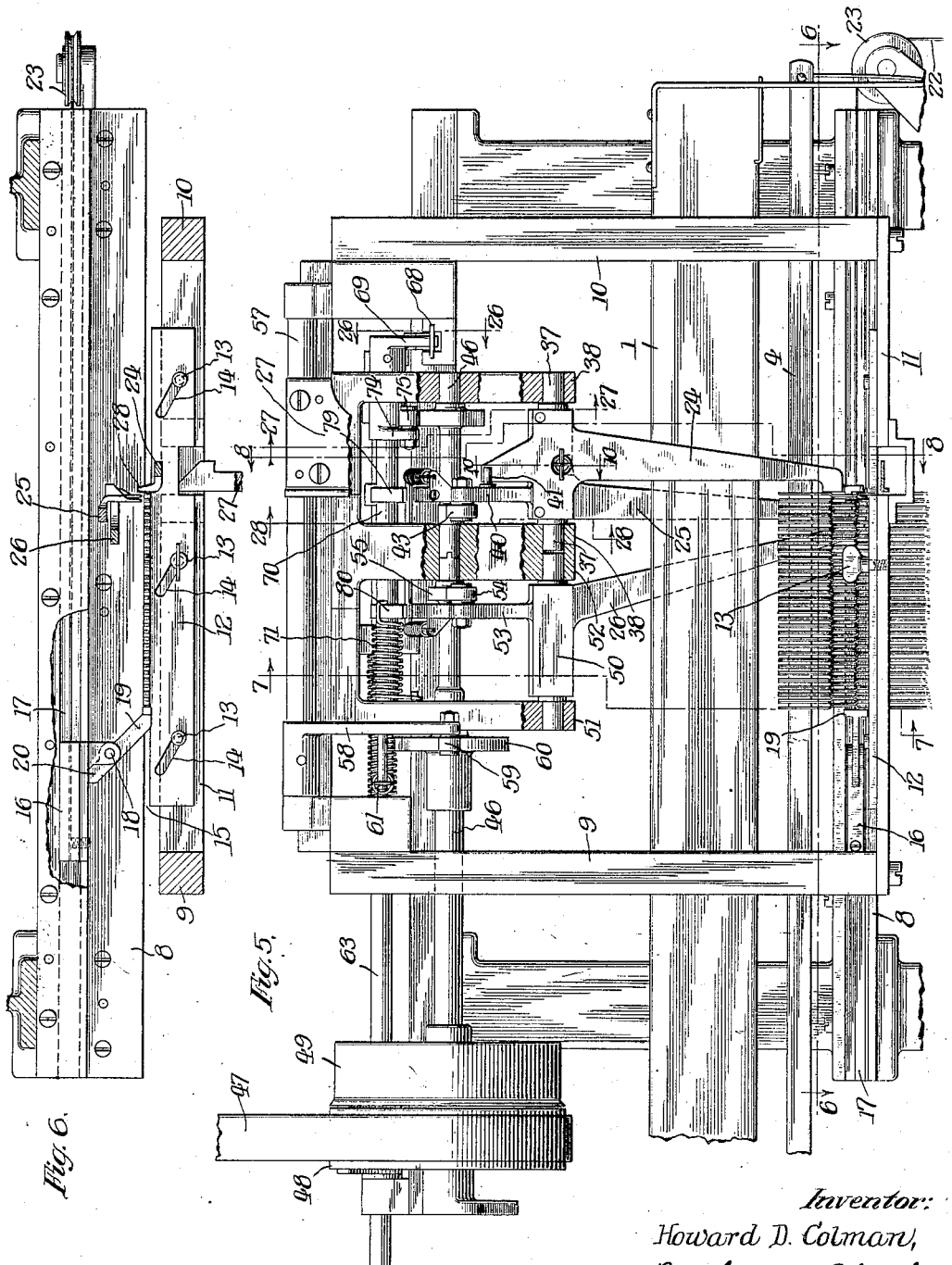
Inventor:
Howard D. Colman,
By Chindahl Parker Kalon
Att'ys

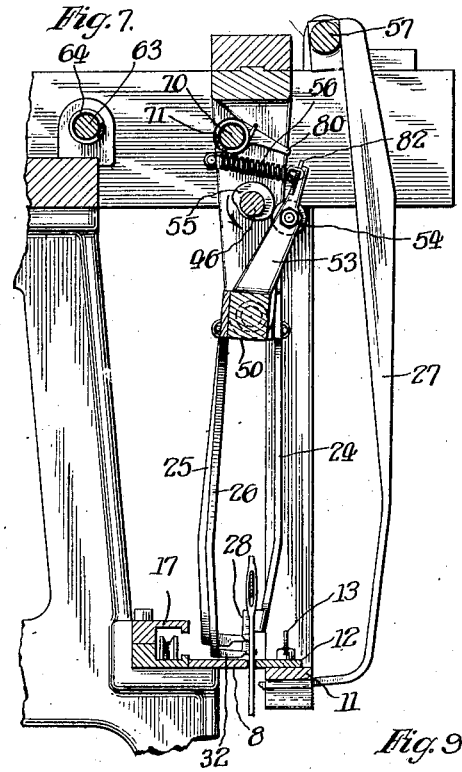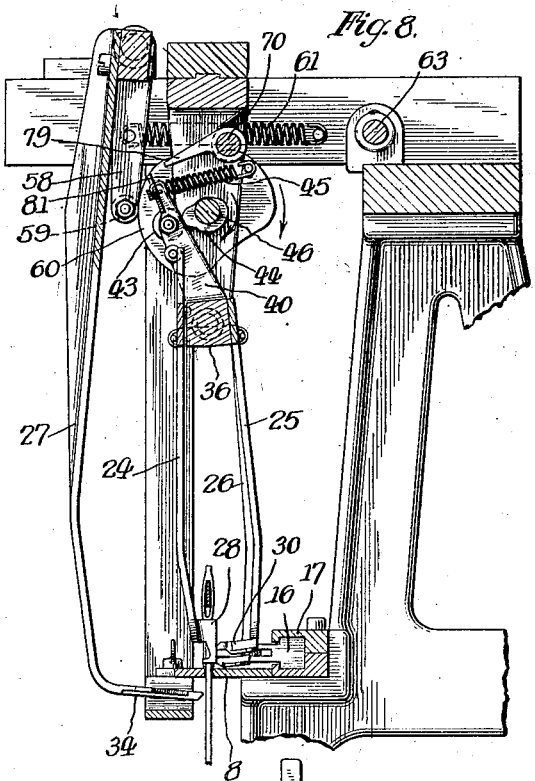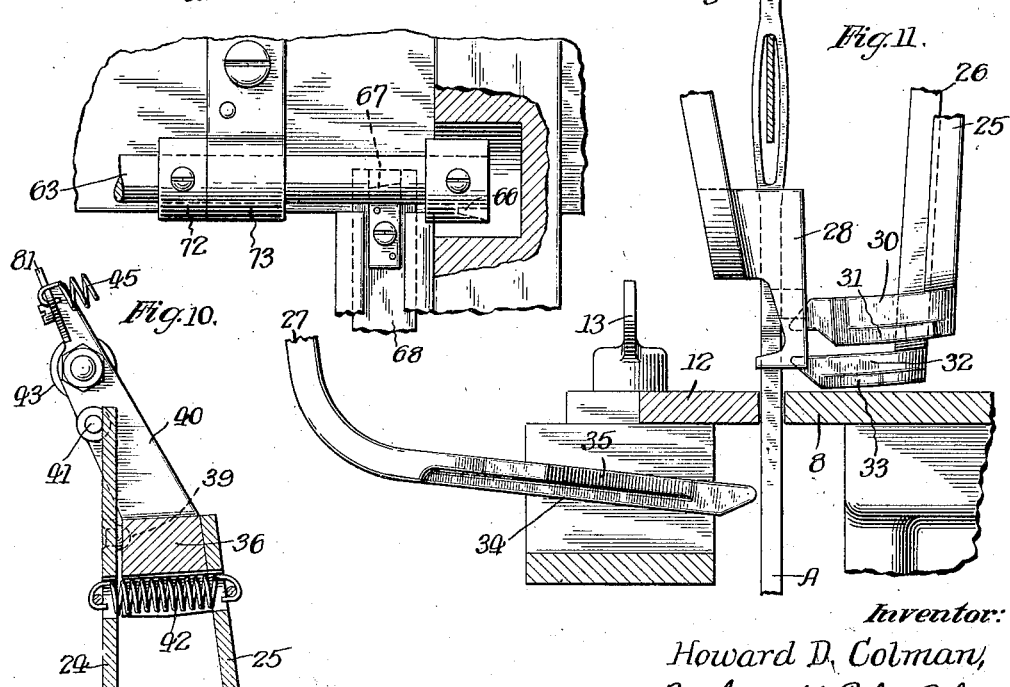

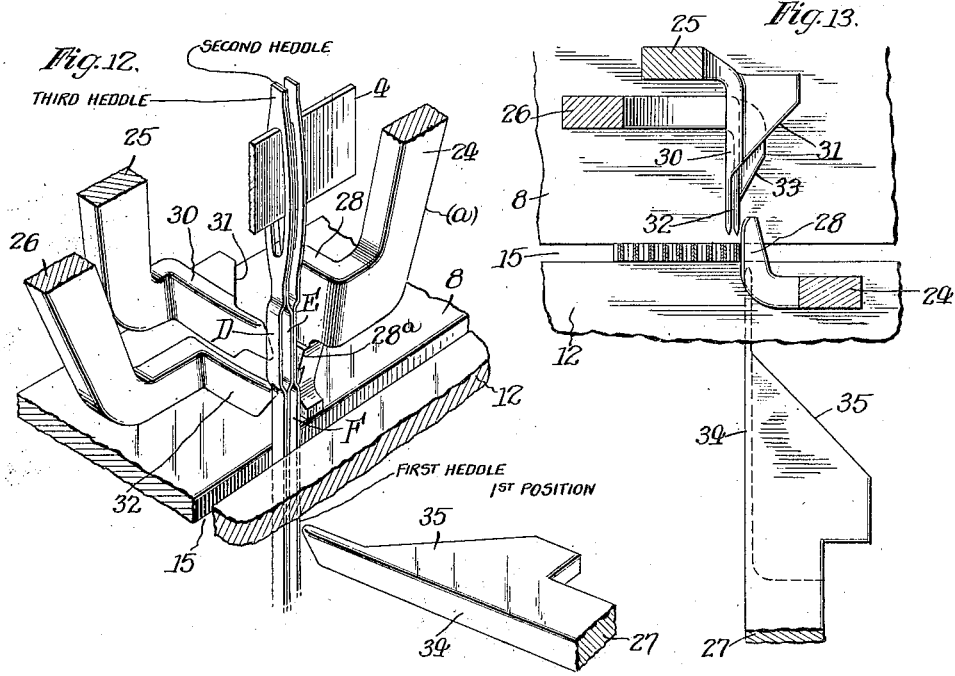
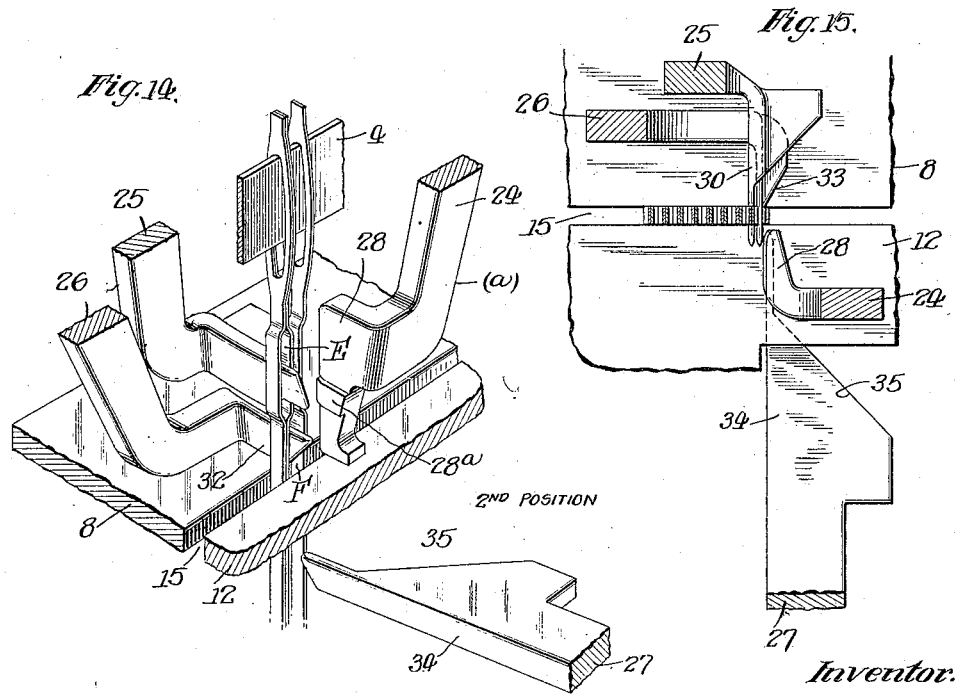

April 29, 1930.　　　H. D. COLMAN　　　1,756,814
HEDDLE HANDLING MECHANISM
Original Filed Feb. 14, 1924　　9 Sheets-Sheet 6
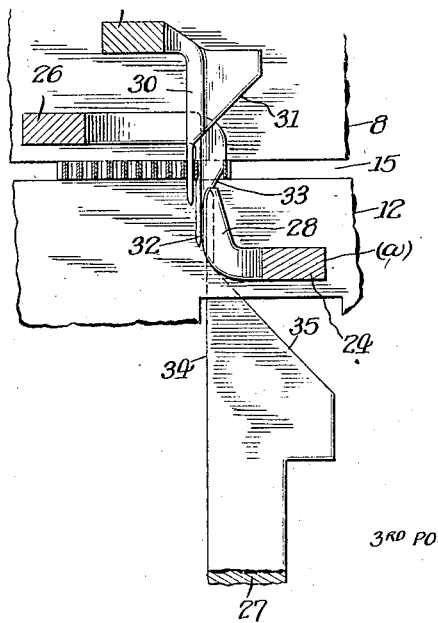
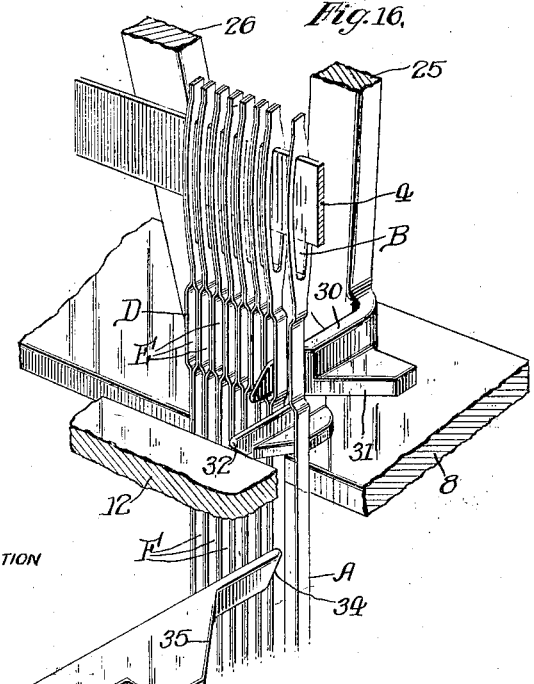
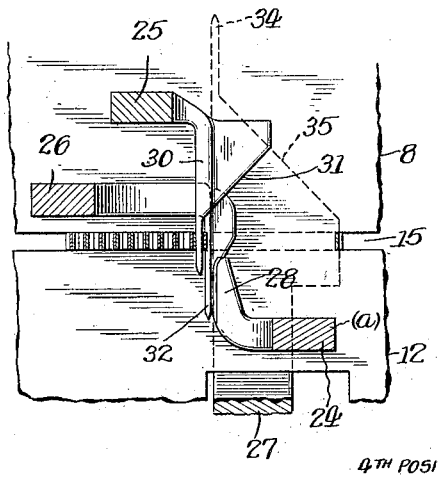
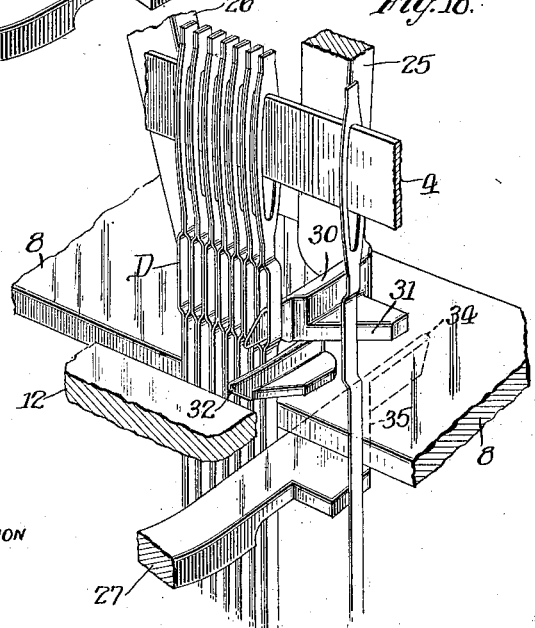
Inventor:
Howard D. Colman,
By Churdahl Parker Carlson
Attys.

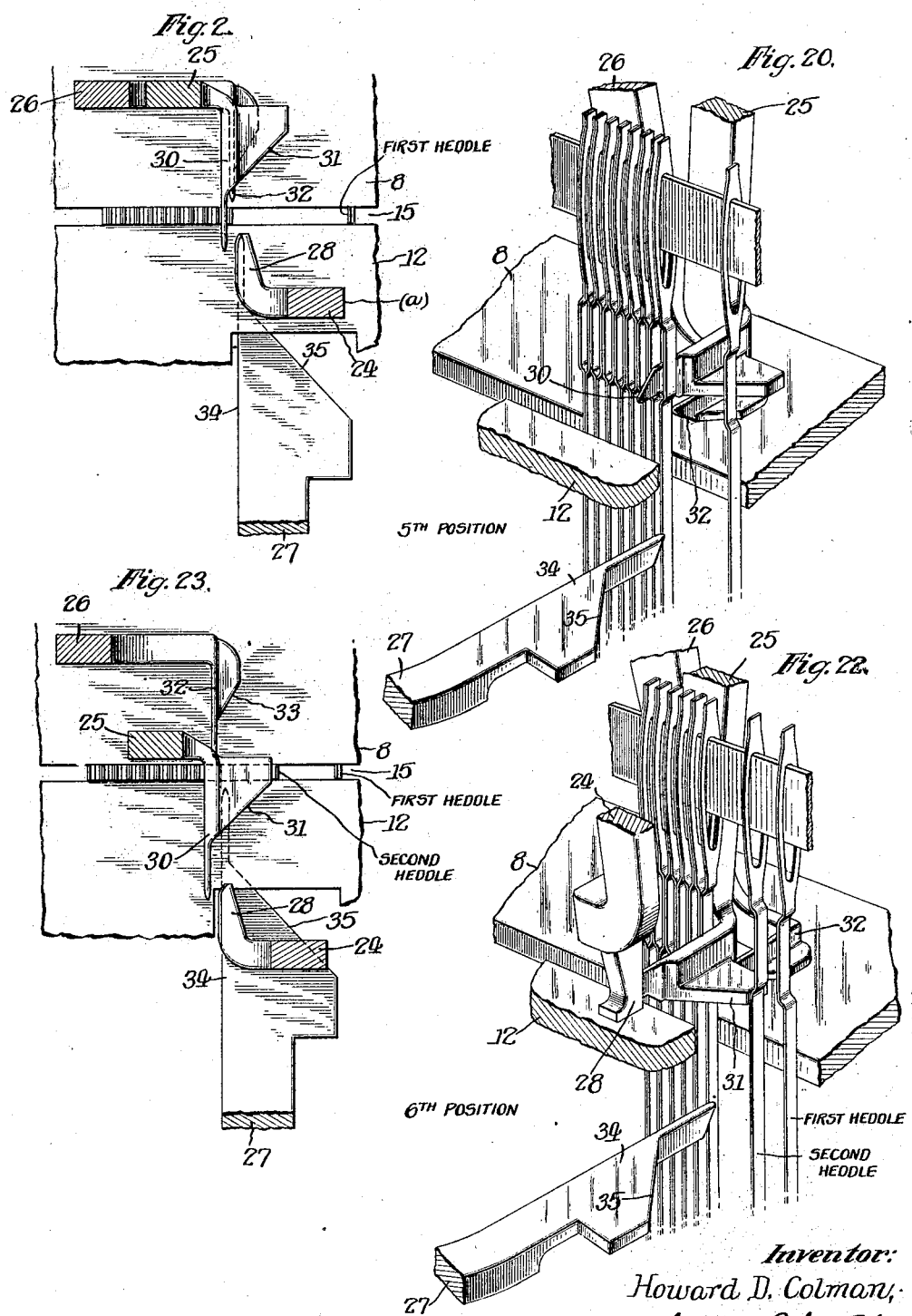

April 29, 1930.   H. D. COLMAN   1,756,814
HEDDLE HANDLING MECHANISM
Original Filed Feb. 14, 1924   9 Sheets-Sheet 8
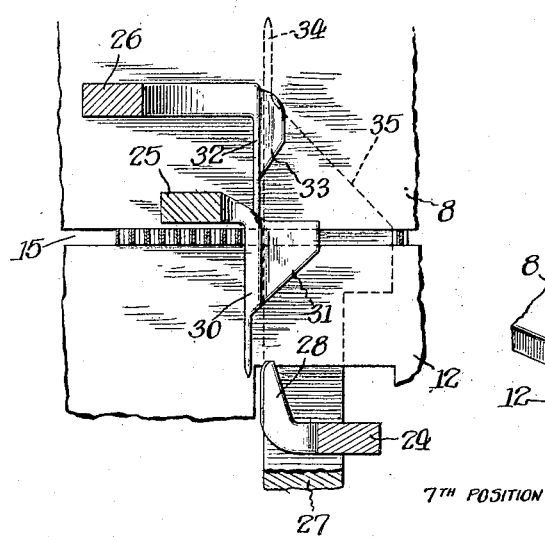
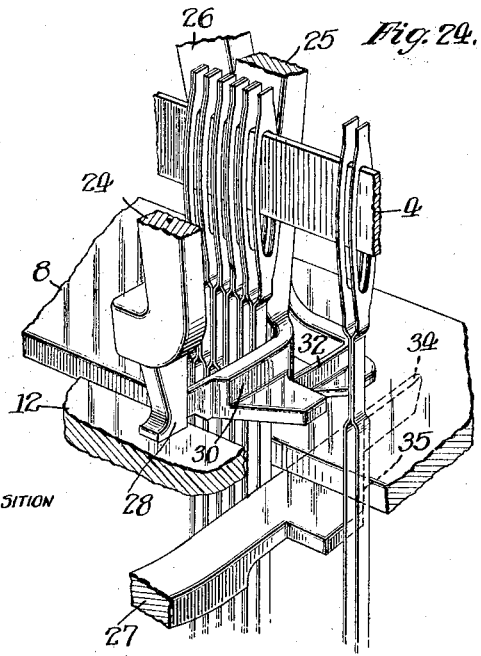
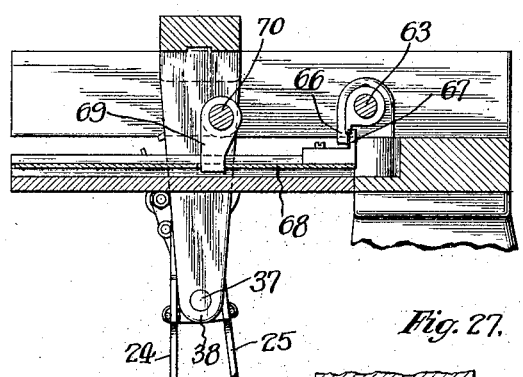
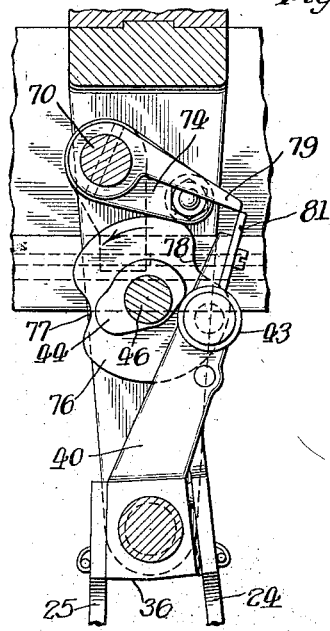
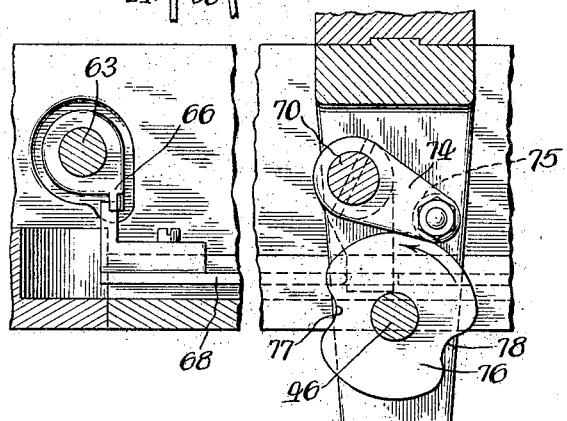
Inventor:
Howard D. Colman,
By Churchill Parker Carlson
Attys.

April 29, 1930.  H. D. COLMAN  1,756,814
HEDDLE HANDLING MECHANISM
Original Filed Feb. 14, 1924   9 Sheets-Sheet 9
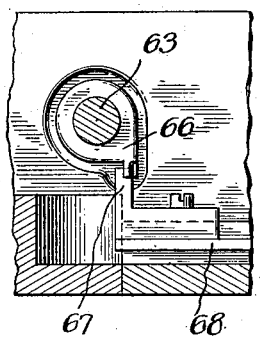
Fig. 29.
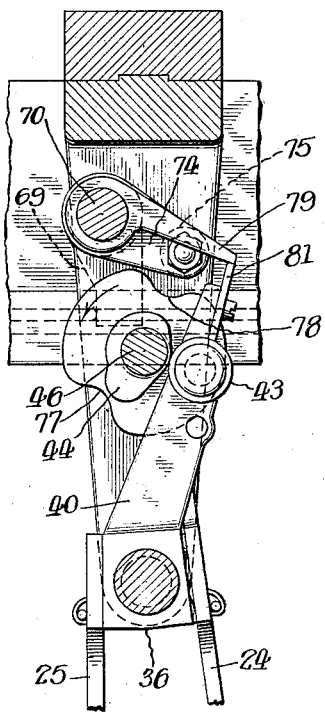
Fig. 32.
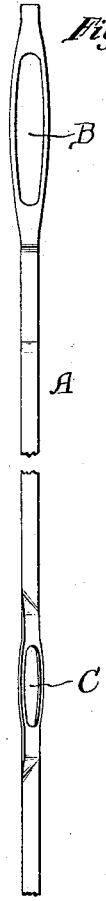
Fig. 31.
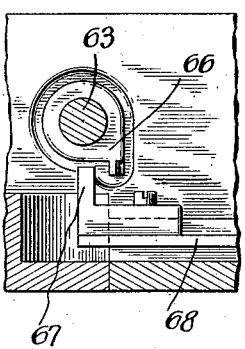
Fig. 30.
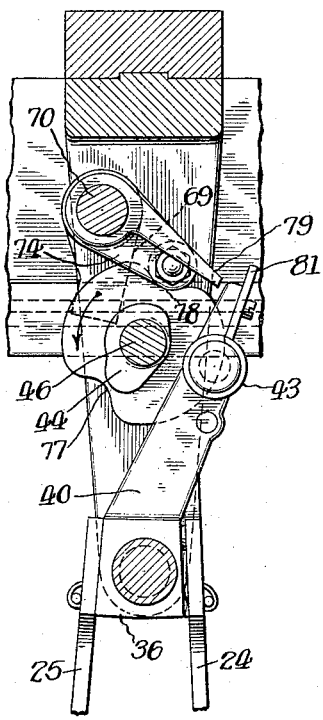
Inventor
Howard D. Colman,
By Churchill Parker Parker
Attys.

Patented Apr. 29, 1930

1,756,814

UNITED STATES PATENT OFFICE

HOWARD D. COLMAN, OF ROCKFORD, ILLINOIS, ASSIGNOR TO BARBER-COLMAN COMPANY, OF ROCKFORD, ILLINOIS, A CORPORATION OF ILLINOIS

HEDDLE-HANDLING MECHANISM

Application filed February 14, 1924, Serial No. 692,645. Renewed August 23, 1928.

The object of this invention, generally stated, is to provide means for operating upon metallic heddles and especially steel heddles of the general type disclosed in the Fehr Patent No. 673,499 and the Kaufmann Patent No. 1,090,858.

More particularly, the invention relates to means for selecting heddles singly and positioning them for the drawing in of warp threads while the heddles are contained within the heddle frame.

In the accompanying drawings, Figure 1 is a front elevation of a machine embodying the features of my invention. Fig. 2 is an end elevation looking from the left-hand side of Fig. 1. Fig. 3 is an elevation of the opposite end of the machine. Fig. 4 is a fragmental plan view. Fig. 5 is a fragmental front elevation upon a larger scale. Fig. 6 is a plan section on line 6—6 of Fig. 5. Fig. 7 is a section on line 7—7 of Fig. 5. Fig. 8 is a section on line 8—8 of Fig. 5. Fig. 9 is a fragmental plan view of the belt shifter lock, the parts being in the position shown in Fig. 30. Fig. 10 is a section on line 10—10 of Fig. 5. Fig. 11 is an enlarged view showing the parts in the position illustrated in Fig. 8. Figs. 12 and 13 likewise show the parts in the position illustrated in Figs. 8 and 11. This position may be termed the first position. Figs. 14 and 15 show the parts in the second position. Figs. 16 and 17 show the parts in the third position. Figs. 18 and 19 represent the parts in the fourth position. Figs. 20 and 21 illustrate the parts in the fifth position. Figs. 22 and 23 show the parts in the sixth position. Figs. 24 and 25 represent the parts in the seventh position. Fig. 26 is a vertical section on line 26—26 of Fig. 5. Fig. 27 is a vertical section on line 27—27 of Fig. 5. Fig. 28 is a vertical section on line 28—28 of Fig. 5. Fig. 29 is a view like that of Fig. 28, but showing the parts in a different position. Fig. 30 shows the same parts in still another position. Figs. 31 and 32 illustrate one of the forms of steel heddle adapted to be handled by the mechanism herein disclosed.

The invention claimed hereinafter is especially intended for incorporation in a warp-drawing machine, but the mechanism shown in the drawings is merely illustrative of the invention and does not represent the invention in operative relation to other mechanisms of a complete warp drawing machine.

The invention is especially, although not exclusively, intended for use in the selection and positioning of metallic heddles while contained in an ordinary heddle frame. Herein there is shown a rigid heddle frame of the general type shown in the Kaufmann Patent No. 1,168,308, said frame comprising top and bottom bars 1 and 2, end bars 3 and top and bottom heddle-supporting bars 4 and 5. Midway between their ends the heddle-supporting bars 4 and 5 are supported in any preferred way, as, for example, by means of hooks 6.

While the invention may be employed in connection with heddles of various forms, the mechanism shown in the drawings is especially designed to operate upon the form of heddle shown in Figs. 31 and 32 and designated A. Said heddle consists of a thin strip or narrow band of steel having at either end an elongated opening B by means of which the heddle may be slidably mounted upon the bars 4 and 5. Intermediate its ends the heddle is provided with an eye C which stands at a slight angle to the plane of the body of the heddle. Just below the upper opening B the heddle is provided with an offset portion having a flat surface D. When the heddles are placed in alternating arrangement, with the surfaces D in contact, there is formed a series of spaces E in the horizontal plane of the offsets, and a series of spaces F below the series of offsets. As shown in Fig. 16, there is a space E at one side of each heddle and a space F at the opposite side of the heddle. In order that the heddle shall be capable of use with either end up, an offset D is provided adjacent each end, but the mechanism herein disclosed does not coact with the lower offset.

Any desired means may be employed to support the heddle frame. The specific character of the heddle-frame supporting means will depend in part upon whether the heddle frame be traversed past stationary heddle-handling mechanism, or whether the heddle frame is stationary and is traversed by the heddle-handling mechanism. While the invention comprehends both arrangements, the present drawings illustrate a stationary mechanism past which the heddles are arranged to move. Fig. 1 illustrates a channel-shaped guide 7 to receive the lower edge of the heddle frame. There being a number of screw heads projecting from the lower edge of the bar 2, the heddle frame may be set in a channel or shoe 7ª (Fig. 1) adapted to slide freely on the guide 7. The heddle frame is held in upright position by means which form a guideway through which the upper portions of the heddles pass.

Referring now to Figs. 5 and 6: 8 is a guide plate fixed in the framework of the machine at the rear of the heddle frame and extending horizontally a short distance below the series of offsets D. 9 and 10 are bars forming part of the stationary framework of the machine, said bars having attached to their lower ends a bar 11. On the bar 11 is adjustably mounted a guide plate 12, said plate being herein shown as connected to the bar 11 by means of headed screws or studs 13 secured in the bar 11 and extending through inclined slots 14 in the plate 12. The guide plate 12 extends parallel with and in the plane of the guide plate 8; and after being manually adjusted with reference to the guide plate 8 to form a guideway 15 through which the heddles may travel, said plate 12 may be fixed in adjusted position by tightening the middle screw 13. It will be understood that when a heddle frame is to be placed in or withdrawn from the machine, the guide plate 12 is moved forward into position to clear the end bars 3 of the heddle frame.

Any preferred means may be employed to keep a group of heddles compacted together in the guideway 15 with the leading heddle pressed against the selecting mechanism. Herein I have shown a slide 16 mounted in a guideway 17 provided in the framework of the machine, said guideway extending parallel with the guideway 15. To the slide 16 is pivoted at 18 (Fig. 6) a presser finger 19 arranged to bear against a heddle at or adjacent to the offset D. The operative position of the presser finger is determined by contact of the stop portion 20 of said finger with the slide 16. Any suitable means may be used to urge the slide 16 in the direction to press the finger 19 against the heddles. Herein is shown a weight 21 which is connected to the slide 16 by means of a flexible connection 22 (Fig. 5), said connection extending over a guide sheave 23. In the present instance, each space E and F is as deep as the width of an individual heddle. In other words, the spaces extend entirely through the series of heddles. Each of said spaces provides an entrance for a relatively thin selecting device which is followed by a wedging device that serves positively to push apart the two heddles between which the given space is formed.

In the present embodiment of the invention the heddle-selecting and positioning mechanism comprises four arms 24, 25, 26 and 27 (Figs. 1, 5 and 6) arranged to swing into and out of engagement with the heddles. The arms 24 and 27 operate at the front of the series of heddles, the arms 25 and 26 being arranged to operate behind the series. The lower end of the arm 24 is formed to provide a finger 28 (Figs. 11, 12 and 13) adapted to serve as an abutment or stop against which a group of heddles may be compacted by the presser finger 19. The finger 28 is arranged to engage the heddle adjacent to the offset, and has a rib 28ª (Figs. 12 and 14) adapted to lie in said offset to support the offset against the pressure transmitted from the presser finger 19.

At the lower end of the arm 25 (Fig. 12) is a finger 30 having a thin forward end which is arranged to enter the space E formed between two heddles by adjacent offsets D. On the finger 30 is an inclined or cam surface 31 which serves to force to the right the heddle at the right of said space E.

The lower end of the arm 26 (Figs. 11 and 12) carries a finger 32 that underlies the finger 30. The finger 32 has a thin forward end arranged to enter the upper end of the space F which is immediately forward of the space E in which the finger 30 operates. On the finger 32 is formed an inclined or cam surface 33 (Fig. 13) adapted to crowd to the right the heddle at the right of said space F.

The lower end of the arm 27 (Fig. 11) is provided with a finger 34 arranged to operate beneath the guide plates 8 and 12. The end of the finger 34 is made pointed to enter the space between a selected heddle and the next succeeding heddle. On the finger 34 is an inclined or cam surface 35 (Fig. 18) to crowd the selected heddle to the right and thus separate said heddle from the remaining unselected heddles.

While any preferred means may be employed to support and operate the arms 24 and 25, they are herein shown as mounted to swing upon an axis located outside of the series of heddles, said arms being connected to a shaft or block 36 (Fig. 10) having journals 37 (Fig. 5) which are mounted in bearings 38 in the machine frame. The arm 25 is rigidly secured to the shaft 36, but the arm 24 is yieldingly connected to said shaft in order that said arm may be swung away from the arm 25 to permit the introduction and withdrawal of a heddle frame, and in order that said arm may yield in case of improper engagement with a heddle. The attaching portion of the arm 24 carries two rounded studs 39 which lie in recesses formed in the shaft 36. Rigid with said shaft is an upwardly extending arm 40 carrying a pin 41 against which the upper end of the arm 24 is normally held by a contractile spring 42.

On the arm 40 is a roller 43 which is normally held in contact with a cam 44 (Fig. 8) by means of a contractile spring 45. The cam 44 is mounted upon a shaft 46 which is driven, in this instance, by means of a belt 47 running over a pulley 48 (Fig. 5) fixed to said shaft. 49 is a loose pulley to which the belt 47 may be shifted.

The means for supporting and oscillating the arm 26 may partake of various forms. In the present instance, the arm 26 is rigidly secured to a shaft 50 (Fig. 5) which is journaled in bearings 51 and 52 in the machine frame, said bearings being alined with the bearings 38. Rigid with the shaft 50 is an arm 53 carrying a roller 54 (Fig. 7) that is held against a cam 55 on the shaft 46 by a contractile spring 56.

The arm 27 is attached to a rock shaft 57 journaled in the machine frame and carrying an arm 58 (Fig. 8) on which is a roller 59 which is held against a cam 60 on the shaft 46 by means of a contractile spring 61.

Means is provided to stop the machine in the event that operation of the arms 25 and 26 be interfered with, as by engagement with a defective or improperly positioned heddle. Upon reference to Fig. 4 it will be seen that the drive belt 47 is engaged by a shifter fork 62 fixed upon a rod 63. An expansive spring 64 surrounding the rod 63 and bearing at one end against the framework of the machine and at its other end against a collar 65 on the rod 63 tends to move said rod longitudinally in the direction to shift the driving belt to the loose pulley 49. The rod 63 is normally held against movement by the spring 64 by means of a lug 66 (Fig. 29) fixed on the rod 63 and pressed by the spring 64 against a lug 67 on a slide 68. The slide 68 is arranged to be moved by means of an arm 69 fixed upon a shaft 70. A torsion spring 71 (Fig. 5) tends to turn the shaft 70 in the direction to move the slide 68 rearwardly to withdraw the locking lug 67 from the lug 66, thus releasing the belt shifter to the action of the spring 64. Movement of the belt shifter under the action of the spring 64 is limited by engagement of a stop collar 72 (Figs. 4 and 9) with a guide 73 for the rod 63.

The torsion spring 71 is normally restrained by means including an arm 74 (Fig. 27) fixed upon the shaft 70 and carrying a roller 75 arranged to bear upon a cam 76 fixed on the shaft 46. Said cam comprises two dwells of equal radii separated by two depressions 77 and 78 (Fig. 27). Means is provided to prevent the roller 75 from dropping into the depressions 77 and 78 while the arms 25 and 26 are operating normally, which means includes two fingers 79 and 80 (Figs. 5, 7 and 8) fixed upon the shaft 70 and two plates 81 and 82 fixed to the arms 40 and 53, respectively, said plates being adapted to underlie and support the fingers 79 and 80 and thus hold the roller 75 out of the depressions 77 and 78 in the cam 76.

The operation is as follows: The mechanism being in the position shown in Figs. 12 and 13, and the guide plate 12 being in its forward position, a heddle frame is inserted into the machine, the arm 24 being manually held forward out of the way of the end bar 3. The guide plate 12 is then adjusted toward the heddles to provide a guideway 15 of proper width. The presser finger is then placed in engagement with a group of heddles to hold them compacted, with the foremost heddle pressed against the finger 28. An explanation of the operation may be facilitated if the foremost three heddles be referred to as the first, second and third heddles. In the rotation of the shaft 46 the finger 28 is withdrawn, that is to say, it is swung to the left, as viewed in Figs. 8 and 11, but before said finger is fully withdrawn from the first heddle, the finger 32 has entered the space F between the first and second heddles (see Fig. 14) so as to detain the second heddle; and the finger 30 has advanced into the space E between the second and third heddles. In the continuing rotation of the shaft 46 the finger 32 is advanced still farther, thereby causing the inclined surface 33 to push the first heddle away from the second heddle, as shown in Figs. 16 and 17. The finger 34 is now projected into the space between the first and second heddles, the inclined surface 35 serving to push the first heddle to the right, as viewed in Figs. 18 and 19, and thus separating the first heddle still farther from the second heddle. The fingers 32 and 34 are then withdrawn from the heddles, as shown in Figs. 20 and 21, after which the finger 30 is advanced to push the second heddle to the right, as shown in Figs. 22 and 23. The finger 34 is then again advanced (as shown in Figs. 24 and 25) to separate the second heddle still farther from the unselected heddles. The fingers 30 and 34 are then withdrawn from the heddles, the finger 28 moving into position to hold back the third heddle before the finger 32 is withdrawn from said heddle. As indicated in Fig. 25, the adjacent ends of the fingers 28 and 30 overlap or extend past each other slightly. The parts are then in the position shown in Figs. 12 and 13 and in readiness for another cycle of operations.

If the finger 30 should engage improperly with a heddle, and thus be prevented from making its complete forward stroke (toward the left in Fig. 8), the plate 81 will not be in position beneath the finger 79 when the depression 78 reaches the roller 75 (see Fig. 30), and therefore the torsion spring 71 will be free to turn the shaft 70 and unlatch the belt shifter.

If the finger 32 should engage a heddle in such a way as to be prevented from making its complete forward stroke (toward the right in Fig. 7), the plate 82 will not be in position beneath the finger 80 when the depression 77 reaches the roller 75, and consequently the torsion spring 71 will be permitted to turn the shaft 70 and release the belt shifter.

If a heddle, because of deformation or improper location, should interfere with the rearward swing of the finger 28 (to the right, as viewed in Fig. 8), the spring 42 (Fig. 10) will yield to prevent breakage as the cam 44 (Fig. 8) revolves; and in the ensuing movement of the finger 32 said finger will be obstructed by the heddle that interfered with the finger 28 or by a neighboring heddle, and will cause stoppage of the machine.

I believe myself to be the first to provide selecting means capable of acting upon steel heddles of the kind hereinbefore mentioned, and desire the appended claims to be construed broadly.

It will be understood that means widely different from the finger 34 may be employed to continue up to the heddle eye the separation initiated by the selector fingers 28, 30 and 32.

The selecting means may comprise reciprocatory parts specifically quite different from the fingers 28, 30 and 32. I regard oscillatory selecting elements as within the scope of my invention.

I claim as my invention:

1. A mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising an abutment finger adapted to engage the foremost heddle, a second finger adapted and arranged to enter the space F behind the foremost heddle and push it along, a third finger adapted and arranged to enter the space E behind the second heddle and push it along, the abutment finger and the third finger being overlapped and arranged to reciprocate as a unit into and out of engagement with the heddles, means to press the group of heddles against the abutment finger or the third finger, means forming a guideway for the heddles below the series of openings E, said fingers operating above said guideway, and means acting below said guideway and arranged to engage a heddle which has been pushed along by the second or third finger to separate it farther from the remainder of the group.

2. A mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising an abutment adapted to engage the foremost heddle, a part adapted and arranged to enter the space F behind the foremost heddle and push it along, a second part adapted and arranged to enter the space E behind the second heddle and push it along, the abutment and the second part being overlapped and arranged to reciprocate as a unit, means forming a guideway for the heddles below the series of openings E, said abutment and pushing parts acting above said guideway, a presser acting in approximate alinement with the series of offsets to compact the group of heddles against the abutment or the second part, and a device acting below said guideway and arranged to engage a heddle which has been pushed along by one of said parts to separate it farther from the remainder of the group.

3. A mechanism adapted to operate upon a group of metallic heddles, said mechanism comprising an abutment finger adapted to engage the foremost heddle, a second finger adapted and arranged to engage the foremost heddle and push it along, a third finger adapted and arranged to engage the second heddle and push it along, the abutment finger and the third finger being overlapped and arranged to reciprocate as a unit into and out of engagement with the heddles, means to press the group of heddles against the abutment finger or the third finger, means forming a guideway for the heddles, said fingers operating above said guideway, and means acting below said guideway and arranged to engage a heddle which has been pushed along by the second or third finger to separate it farther from the remainder of the group.

4. A mechanism adapted to operate upon a group of metallic heddles, said mechanism comprising an abutment adapted to engage the foremost heddle, a part adapted and arranged to engage the foremost heddle and push it along, a second part adapted and arranged to engage the second heddle and push it along, the abutment and the second part being overlapped and arranged to reciprocate as a unit into and out of engagement with the heddles, a presser to compact the group of heddles against the abutment or said second part, means forming a guideway for the heddles, said abutment and heddle-pushing parts operating above said guideway, and a device acting below said guideway and arranged to engage a heddle which has been pushed along by one of said parts to separate it farther from the remainder of the group.

5. A mechanism adapted to operate upon a group of steel heddles contained within a rigid heddle frame consisting of top and bottom bars, end bars, and top and bottom heddle-supporting bars, said heddles being slidably mounted upon said heddle-supporting bars, means to slidably support the bottom bar of the heddle frame, means forming a guideway for the heddles below and adjacent to the top bar, whereby the heddles are held in single file, means acting on the heddles above said guideway for selecting heddles singly and successively from the group, a presser acting on the group of heddles above said guideway to advance them to the selecting means, and hold them compacted, and a separator acting on selected heddles below said guideway to separate them farther from the remainder of the group.

6. A mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising an abutment finger adapted to engage the foremost heddle, a second finger adapted and arranged to enter the space F behind the foremost heddle and push it along, a third finger adapted and arranged to enter the space E behind the second heddle and push it along, the abutment finger and the third finger being overlapped and arranged to reciprocate as a unit into and out of engagement with the heddles, means to press the group of heddles against the abutment finger or the third finger, and means arranged to engage a heddle which has been pushed along by the second or third finger to separate it farther from the remainder of the group.

7. A mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising an abutment adapted to engage the foremost heddle, a part adapted and arranged to enter the space F behind the foremost heddle and push it along, a second part adapted and arranged to enter the space E behind the second heddle and push it along, the abutment and the second part being overlapped and arranged to reciprocate as a unit, a presser acting in approximate alinement with the series of offsets to compact the group against the abutment or the second part, and means arranged to engage a heddle which has been pushed along by one of said parts to separate it farther from the remainder of the group.

8. A mechanism adapted to operate upon a group of metallic heddles, said mechanism comprising an abutment adapted to engage the foremost heddle, a part adapted and arranged to engage the foremost heddle and push it along, a second part adapted and arranged to engage the second heddle and push it along, the abutment and the second part being overlapped and arranged to reciprocate as a unit into and out of engagement with the heddles, a presser to compact the group of heddles against the abutment or said second part, and a device arranged to engage a heddle which has been pushed along by one of said parts to separate it farther from the remainder of the group.

9. A mechanism adapted to operate upon a group of steel heddles contained within a rigid heddle frame consisting of top and bottom bars, end bars, and top and bottom heddle-supporting bars, said heddles being slidably mounted upon said heddle-supporting bars, means to slidably support the bottom bar of the heddle frame, devices acting on the heddles adjacent to the top heddle-supporting bar to separate the heddles singly and successively from the group, a presser to advance the group to said devices, and hold the heddles compacted, and a separator acting on selected heddles to separate them farther from the remainder of the group.

10. A mechanism adapted to operate upon a group of steel heddles contained within a rigid heddle frame consisting of top and bottom bars, end bars, and top and bottom heddle-supporting bars, said heddles being slidably mounted upon said heddle-supporting bars, each heddle having an offset near its upper end below the upper heddle-supporting bar, the heddles alternating in position with the outer sides of the offsets in contact so as to form a series of spaces E in the horizontal plane of the offsets, means to slidably support the bottom bar of the heddle frame, means forming a guideway for the heddles below and adjacent to the offsets, means acting on the heddles above said guideway for selecting heddles singly and successively from the group, and a separator acting on selected heddles below said guideway to separate them farther from the remainder of the group.

11. A mechanism adapted to operate upon a group of steel heddles contained within a rigid heddle frame consisting of top and bottom bars, end bars, and top and bottom heddle-supporting bars, said heddles being slidably mounted upon said heddle-supporting bars, means to slidably support the bottom bar of the heddle frame, means forming a guideway for the heddles below and adjacent to the top bar, whereby the heddles are held in single file, means acting on the heddles above said guideway for selecting heddles singly and successively from the group, and a separator acting on selected heddles below said guideway to separate them farther from the remainder of the group.

12. A mechanism adapted to operate upon a group of metallic heddles, said mechanism comprising an abutment adapted to engage the foremost heddle, a part adapted and arranged to engage the foremost heddle and push it along, a second part adapted and arranged to engage the second heddle and push it along, the abutment and the second part being overlapped and arranged to reciprocate as a unit into and out of engagement with the heddles, a presser to compact the group of heddles against the abutment or said second part, and means forming a guideway for the heddles, said abutment and heddle-pushing parts operating above said guideway.

13. A mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising parts adapted and arranged to enter said spaces and push the heddles, singly and successively away from the series, and a device arranged to engage a heddle which has been thus pushed along, to separate it farther from the remainder of the group.

14. A mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising an abutment finger adapted to engage the foremost heddle, a second finger adapted and arranged to enter the space F behind the foremost heddle and push it along, a third finger adapted and arranged to enter the space E behind the second heddle and push it along, the abutment finger and the third finger being overlapped and arranged to reciprocate as a unit into and out of engagement with the heddles, and means to press the group of heddles against the abutment finger or the third finger.

15. A mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising an abutment adapted to engage the foremost heddle, a part adapted and arranged to enter the space F behind the foremost heddle and push it along, a second part adapted and arranged to enter the space E behind the second heddle and push it along, the abutment and the second part being overlapped and arranged to move as a unit, and a presser to hold the group compacted against the abutment or the second part.

16. A mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising parts adapted and arranged to enter said spaces and push the heddles, singly and successively, away from the group, and a presser to hold the group of heddles against said parts.

17. A mechanism adapted to operate upon a group of steel heddles contained within a rigid heddle frame consisting of top and bottom bars, end bars and top and bottom heddle-supporting bars, said heddles being slidably mounted upon said heddle-supporting bars, said mechanism comprising parts located adjacent to said top heddle-supporting bar and adapted and arranged to select heddles singly and successively from the group and push them along the heddle-supporting bars and away from said group, and a presser to push the group toward said selecting parts and hold the heddles compacted.

18. A mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising an abutment finger adapted to engage the foremost heddle, a second finger adapted and arranged to enter the upper end of the space F behind the foremost heddle and push it along, a third finger adapted and arranged to enter the space E behind the second heddle and push it along, the abutment finger and the third finger being overlapped and arranged to reciprocate as a unit into and out of engagement with the heddles, and means forming a guideway for the heddles below and adjacent to the series of openings E, said fingers operating above said guideway.

19. In a machine adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, means forming a guideway through which the group may pass, and means to hold the group compacted together.

20. A mechanism adapted to operate upon a group of steel heddles contained within a rigid heddle frame consisting of top and bottom bars, end bars and top and bottom heddle-supporting bars, said heddles being slidably mounted upon said heddle-supporting bars, each heddle having an offset near its upper end below the upper heddle-supporting bar, the heddles alternating in position with the outer sides of the offsets in contact so as to form a series of spaces E in the horizontal plane of the offsets, and a series of spaces F below the series of offsets, said mechanism comprising parts adapted and arranged to enter said spaces and push the heddles singly and successively along the heddle-supporting bars and away from said group.

21. A heddle-selecting mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising reciprocatory parts adapted and arranged to engage the first, second and third heddles of the group and push the first and second heddles away from the group in each cycle of operations, certain of said parts entering the spaces E and F.

22. A heddle-selecting mechanism adapted to operate upon a group of steel heddles each having an offset near its upper end, the heddles alternating in position, with the outer sides of the offsets in contact, so as to form a series of spaces E in the horizontal plane of the offsets and a series of spaces F below the series of offsets, said mechanism comprising parts adapted and arranged to enter said spaces and push the heddles, singly and successively, away from the group.

23. A mechanism for operating upon heddles having, in combination, a reciprocatory heddle-selecting element, driving means, a spring tending to throw out the driving means, a lock to restrain the spring, and means tending to operate the lock to release the spring, said heddle-selecting element being arranged, when operating normally, to prevent operation of the lock-operating means.

24. A mechanism for operating upon heddles having, in combination, a stop mechanism comprising a rotary cam having a dwell and a depression, and a member arranged to engage said cam; and a reciprocatory heddle-selecting element arranged, when in proper engagement with the heddle, to support said member while the depression is passing thereunder.

25. A mechanism for operating upon heddles having, in combination, a stop mechanism comprising a part having a dwell and depression, and a member arranged to engage said part; and a reciprocatory heddle-positioning element arranged, when in proper engagement with the heddle, to support said member while the depression is passing thereunder.

26. A mechanism adapted to operate upon a group of heddles shaped to provide near their upper ends two series of spaces between adjacent heddles each space extending entirely through the group of heddles, said mechanism comprising means adjacent to the upper ends of the heddles to form a guideway to hold the heddles in single file, heddle-selecting means adapted to enter said spaces and push the foremost heddle away from the remainder of the group and means to hold the group compacted together.

27. A mechanism adapted to operate upon a group of heddles shaped to provide near their upper ends two series of spaces between adjacent heddles, each space extending entirely through the group of heddles, said mechanism comprising means adjacent to the upper ends of the heddles to form a guideway to hold the heddles in single file, and heddle-selecting means arranged to enter said spaces and push the foremost heddle away from the remainder of the group.

28. A mechanism adapted to operate upon a compact series of metallic heddles formed to provide a space between successive heddles, said spaces extending entirely through the series of heddles, and heddle selecting means including a relatively thin element adapted to enter said spaces, and a wedge-shaped element following said thin element and adapted to spread apart the heddles between which the space is formed.

29. A mechanism adapted to operate upon a compact series of heddles formed to provide a space between successive heddles, said spaces extending entirely through the series of heddles, and heddle selecting means including a relatively thin element adapted to enter said spaces, and a wedge-shaped element following said thin element and adapted to spread apart the heddles between which the space is formed, said elements being pivoted upon an axis located outside of the series of heddles.

30. In a mechanism for handling a series of steel heddles contained in a rigid heddle frame, the opposite ends of the heddles being slidably mounted on parallel upper and lower bars forming part of the heddle frame, said mechanism comprising means for slidably and removably supporting such a heddle frame, oscillatory heddle-selecting means arranged to operate on the heddles close to one of said bars, the axis of said selecting means being located outside of the series of heddles, and means to slide selected heddles successively along said bars.

In testimony whereof, I have hereunto affixed my signature.

HOWARD D. COLMAN.